United States Patent [19]

Tanigawa

[11] Patent Number: 4,741,416
[45] Date of Patent: May 3, 1988

[54] HYDRAULIC SHOCK ABSORBER WITH ADJUSTABLE DAMPING FORCE

[75] Inventor: Fujio Tanigawa, Yokohama, Japan

[73] Assignee: Tokico Ltd., Kanagawa, Japan

[21] Appl. No.: 893,638

[22] Filed: Aug. 7, 1986

[30] Foreign Application Priority Data

Aug. 15, 1985 [JP] Japan .................. 60-179847

[51] Int. Cl.[4] ............ F16K 31/02; F16F 9/46
[52] U.S. Cl. ................. 188/299; 188/285; 251/129.06; 251/129.11
[58] Field of Search .......... 188/299, 267, 285; 251/129.06, 129.11

[56] References Cited

U.S. PATENT DOCUMENTS

| | | | |
|---|---|---|---|
| 3,465,732 | 9/1969 | Kattches | 251/129.06 X |
| 4,577,832 | 3/1986 | Sogabe | 251/129.11 |
| 4,647,006 | 3/1987 | Glynn et al. | 251/129.11 |

FOREIGN PATENT DOCUMENTS

| | | | |
|---|---|---|---|
| 221031 | 12/1983 | Japan | 188/299 |
| 846800 | 7/1981 | U.S.S.R. | 251/129.06 |

Primary Examiner—Kenneth J. Dorner
Assistant Examiner—Peter R. Brown
Attorney, Agent, or Firm—Wenderoth, Lind & Ponack

[57] ABSTRACT

A hydraulic shock absorber of the adjustable damping force type includes a piston rod which is projected out of a cylinder and provided with a damping factor adjusting actuator includes a casing. The actuator accommodating a rotor for rotation with an adjusting rod, an ultrasonic vibratory element and a vibration transmitting member. A high frequency voltage is applied to the ultrasonic vibratory element from outside to generate surface waves of a high frequency on the surface of the vibration transmitting member to rotationally drive the rotor. The rotor thus rotates the adjusting rod to adjust the damping force of the hydraulic shock absorber.

9 Claims, 2 Drawing Sheets

HYDRAULIC SHOCK ABSORBER WITH ADJUSTABLE DAMPING FORCE

BACKGROUND OF THE INVENTION

1. Field of the Invention

This invention relates to a hydraulic shock absorber, the damping force of which is adjustable by operating an actuator from the exterior of the shock absorber.

2. Description of the Prior Art

There are generally known in the art the so-called adjustable damping type hydraulic shock absorbers, which employ a piston rod projected out of a cylinder, an adjusting rod extended through the piston rod, and an actuator for tuning the adjusting rod to adjust the damping force.

The actuator of the hydraulic shock absorbers of this sort is usually in the form of a rotary actuator consisting of a motor and a reducing mechanism or a reciprocating actuator adapted to drive a rack and pinion mechanism by a solenoid. In any case, the actuator itself is considerably large in size and weight.

Therefore, the prior art requires a large space in the axial direction of a hydraulic shock absorber for mounting an actuator on the projected end of a piston rod, and difficulties are often encountered in mounting actuators on vehicles which have only a small mounting space. In a case where a reducing mechanism is used, there arises another problem that mechanical noises are produced during operation. Further, where a stopper of a resilient member is provided in an actuator to limit its operating position, there is the possibility of the actuator's operating position being shifted by bounding movement of the resilient member.

SUMMARY OF THE INVENTION

It is an object of the present invention to provide an adjustable damping force hydraulic shock absorber employing an actuator of small size and weight to minimize the required actuator mounting space in the axial direction.

Aother object of the invention is to provide an adjustable damping force hydraulic shock absorber which obviates the conventional reducing and stopper mechanisms and which can prevent production of noise and deviations of the operating position of the actuator.

In accordance with the present invention, the above-mentioned objects are achieved by the provision of an adjustable damping force type hydraulic shock absorber essentially including a piston rod projected out of a cylinder, an adjusting rod extending axially through the piston rod, and an actuator mounted on the piston rod, characterized in that the actuator comprises: a casing mounted on the projected end of the piston rod; a rotor mounted on the adjusting rod and rotatable integrally therewith within the casing; an ultrasonic vibratory element provided in the casing for generating ultrasonic vibrations upon application of a high frequency voltage from the exterior; and a vibration transmitting member interposed between the ultrasonic vibratory element and rotor to rotate the latter by vibration of the ultrasonic vibratory element.

BRIEF DESCRIPTION OF THE DRAWINGS

The above and other objects, features and advantages of the invention will become apparent from the following description and the appended claims, taken in conjunction with the accompanying drawings which show by way of example some preferred embodiments of the invention and in which:

DESCRIPTION OF THE PREFERRED EMBODIMENTS

Figure 1:
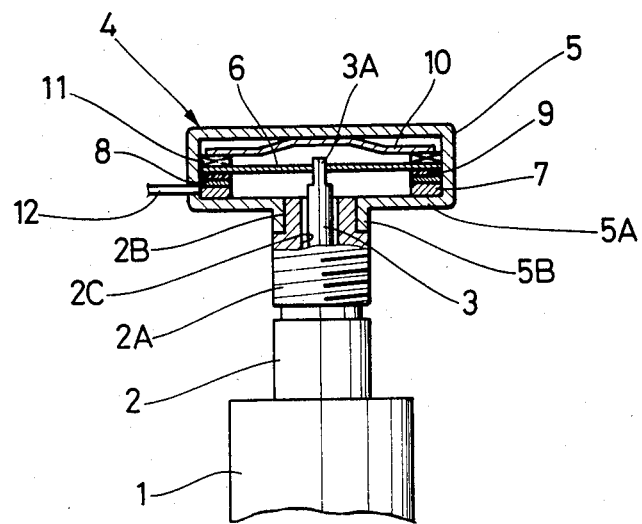
FIG. 1 is a vertical section showing major components of an adjustable damping force hydraulic shock absorber according to the present invention.
Figure 2:
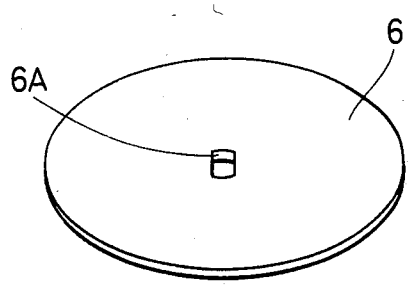
FIG. 2 is a perspective view of a rotor shown in FIG. 1.
Figure 3:
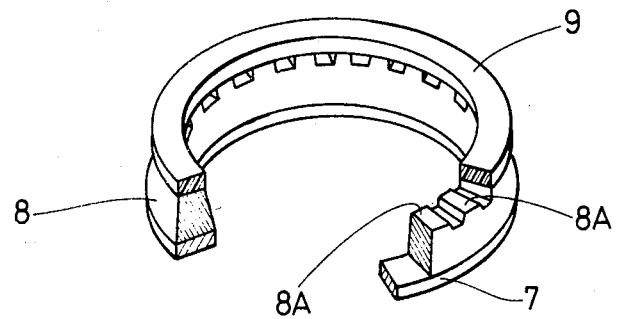
FIG. 3 is a partly cutaway perspective view showing a rubber ring, a vibration transmitting member and piezoelectric member shown in FIG. 1.
Figure 4:
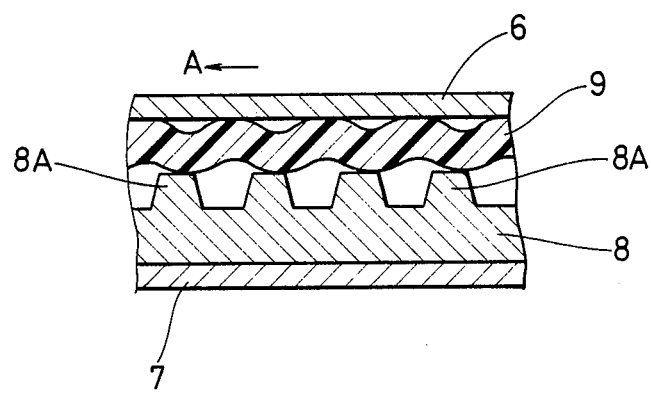
FIG. 4 is a diagrammatic view explanatory of the principles of operation of an actuator.

Referring to FIGS. 1 to 4, there is shown a first embodiment of the invention, in which indicated at 1 is a cylinder constituting the casing of a hydraulic shock absorber, and at 2 is a piston rod having its fore end projected from the cylinder 1 and its base end securely fixed to a piston (not shown) which is slidably fitted in the cylinder 1. The piston rod 2 is provided with a male screw 2A and a stepped portion 2B at its fore end and is securely fixed to a vehicle body (not shown) through the male screw 2A. The piston rod 2 is further provided with an axial bore 2C to receive therein an adjusting rod 3 which will be described hereinafter.

The adjusting rod 3 is extended through the axial bore 2C of the piston rod 2, and its fore end which is protruded from the fore end of the piston rod 2 is provided with a fitting joint portion 3A which is chamfered on opposite sides thereof. This joint portion 3A is fitted in a rotor 6 of an actuator 4 which will be described hereinafter, so that the adjusting rod 3 is rotationally driven through the rotor 6. Attached to the base end of the adjusting rod 3 is a valve (not shown) which is rotatable with the adjusting rod 3 to open or close a damping adjusting mechanism (not shown) in the cylinder 1 for adjusting the damping force which will be produced in the cylinder 1.

The actuator 4 for rotating the adjusting rod 3 is constituted by a casing 5, a rotor 6, ring-shaped piezoelectric element 7, a vibration transmitting member 8, a resilient or rubber ring 9, a spring 10 and a bearing 11.

The casing 5 is of a flat cylindrical shape and is detachably fixed to the stepped portion 2B of the piston rod 2 through a joint portion 5B which is projected from its bottom portion 5A.

The rotor 6 is shaped in a disk-like form and is fitted on the joint portion 3A of the adjusting rod 3 through a centrally provided fitting hole 6A for rotation in the casing 5.

The ring-shaped piezoelectric element 7 constitutes an ultrasonic vibratory element according to the invention and generates ultrasonic vibrations. To generate ultrasonic vibrations, the piezoelectric element 7 is supplied with a high frequency voltage from a high frequency power supply (not shown) through wiring 12. The piezoelectric element 7 is formed, for example, from a piezoelectric ceramic material such as barium titanate or the like.

The vibration transmitting member 8 is formed in a ring-like shape and has its lower side secured to the upper side of the ring-shaped piezoelectric element 7 by an adhesive or other suitable means. The vibration transmitting member 8 is provided with a large number of protrusions such as trapezoidal teeth 8A at predetermined intervals on the upper side thereof, to generate surface waves on the trapezoidal teeth 8A in resonance with the vibration of the ring-shaped piezoelectric element 7. The vibration transmitting member 8 is formed, for example, from a resilient metallic material such as brass, aluminum or the like.

Further, the rubber ring 9 is interposed between and in contact with the vibration transmitting member 8 and the rotor 6 to increase the friction coefficient between these two members, and is formed from, e.g., a synthetic resin material with a high abrasion resistance.

The afore-mentioned spring 10 is a belleville spring which is interposed between the upper side of the rotor 6 and the inner wall surface of a lid portion of the casing 5, pushing the rotor 6 downward to press the rotor 6 and rubber ring 9 against the respective trapezoidal tooth portions 8A of the vibration transmitting member 8 under a predetermined load.

The bearing 11 is interposed between the spring 10 and motor 6 for the purpose of ensuring smooth rotation of the rotor 6 relative to the spring 10. For the bearing 11, it is preferred to use a plain bearing of a self-lubricating resin or a ball bearing.

Thus, upon applying a high frequency voltage, the ring-shaped piezoelectric element 7 generates ultrasonic vibrations, producing surface waves on the surfaces of the trapezoidal tooth portions 8A of the vibration transmitting member 8. Since the rotor 6 and rubber ring 9 are pressed toward the trapezoidal tooth portions 8A under a predetermined load, the rubber ring 9 is waved by the surface waves of the vibration transmitting member 8 as shown particularly in FIG. 4 and rotated in the direction of arrow A, driving the rotor 6 to rotate in the direction of arrow A. Thus, vibration transmitting member 8 and resilient ring member 9 for a transducer to transduce vibrations of ultrasonic vibratory element 7 into rotary motion of rotor 6.

The adjustable damping force hydraulic shock absorber of the above-described construction operates in the following manner.

If the piston rod 2 is extended out or contracted relative to the cylinder 1, the piston is slides in the cylinder 1 to produce a damping force therein. For adjusting this damping force, a high frequency voltage is applied to the piezoelectric element 7 through wiring 12. By so doing, the piezoelectric element 7 generates ultrasonic vibrations thereby producing surface waves of high frequency on the surfaces of the rubber ring 9 through the respective tooth portions 8A of the vibration transmitting memrber 8 and rotating the rubber ring 9 in the direction of arrow A. As a result, the rotor 6 which is pressed against the rubber ring 9 is driven to rotate in the direction of arrow A, rotating therewith the adjusting rod 3 to open or close the damping force adjusting mechanism in the cylinder 1 e.g. a value, thus for adjusting the damping force to a desired level.

Figure 5:
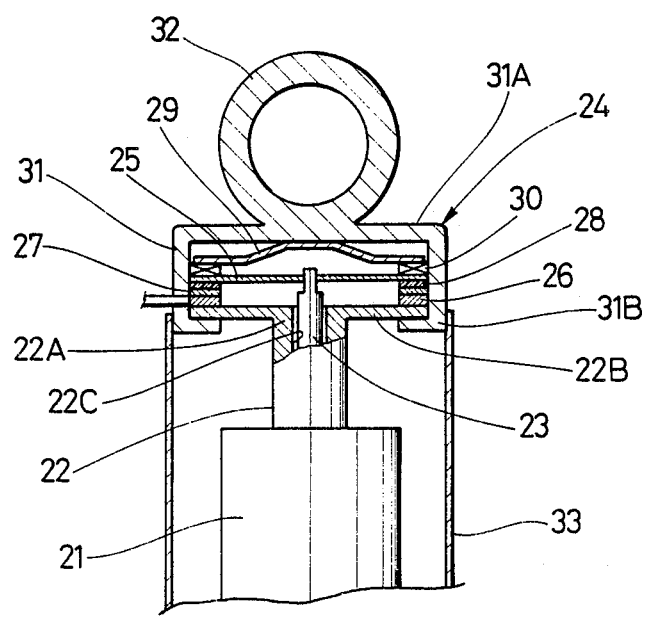
FIG. 5 is a vertical section showing major components of another embodiment of an adjustable damping force hydraulic shock absorber according to the invention.

FIG. 5 shows a second embodiment of the invention, which is provided with a mounting eye on the actuator casing to permit the piston rod to be attached to the vehicle body through the mounting eye.

In this figure, denoted at 21 is a cylinder, and at 22 a piston rod which is projected from the cylinder 21. The piston rod 22 has a radially extending annular flange 22B secured to its fore end 22A by welding or other suitable means, and has an axial bore 22C for receiving an adjusting rod 23. Indicated at 24 is an actuator for turning the adjusting rod 23 at the time of adjustment of the daming force, the actuator 24 including, similarly to the above-described first embodiment, a rotor 25, a ring-shaped piezoelectric element 26, a vibration transmitting member 27, a rubber ring 28, a belleville spring 29 and a bearing 30, which are accommodated in a bottomed cylindrical casing 31.

In this instance, the casing 31 has a flat cylindrical shape with small dimensions in the axial direction, and a mounting eye 32 is integrally secured to a closed end portion 31A thereby to fit the piston rod 22 to a vehicle body (not shown). On the side of an open end portion 31B, the casing 31 is secured to the flange 22B by caulking or other suitable means. The rotor 25 and rubber ring 28 are rotatably mounted in the casing 31, and the piezoelectric element 26 is supported on the flange 22B. The reference numeral 33 denotes an outer cylinder which protects the piston rod 22 and cylinder 21, and which has its upper end securely fixed to the circumference of the casing 31 by welding or other suitable means.

In this embodiment, the mounting eye 32 is provided integrally with the closed end portion 31A of the flat casing 31, and the actuator 24 itself is formed smaller in size and weight, thus making it possible to reduce the basic length as well as the weight of the shock absorber.

Although the rotor and rubber ring are held in pressed contact with each other by a spring in the foregoing embodiments, they may be secured to each other by a adhesive or the like for rotation as an integral body if desired. The spring is not restricted to a belleville spring, and a coil spring or other kinds of springs may of course be employed for this purpose.

Further, although the vibration transmitting member and piezoelectric element have been described as being bonded to each other in the foregoing embodiments, the ultrasonic vibratory element may be formed by anchoring a piezoelectric element in a vibration transmitting member.

Moreover, for the ultrasonic vibratory element, there may be employed, for example, a magnetostrictive resonator consisting of a magnetic element and a coil, a piezoelectric resonator such as a quartz resonator or the like, or an electromagnetic ultrasonic resonator consisting of a DC electromagnet and a coil.

An advantage of the invention resides in that the actuator can be simplified in construction and minimized in axial dimensions to a considerable degree, thus making it possible to provide an adjustable damping force hydraulic shock absorber of smaller size and weight. This invention has another advantage that a hydraulic shock abosrber with adjustable damping force can be mounted even on a vehicle with only a small mounting space for the actuator. Further, the invention obviates the necessity for a reducing mechanism or solenoid as employed by the prior art, to prevent production of operating noises.

Although the invention has been described and shown by way of its preferred embodiments, it is to be understood that various modifications and alterations are possible without departing from the fundamental concept of the invention.

What is claimed is:

1. In an adjustable damping force hydraulic shock absorber including a piston rod projected out of a cylinder, an adjusting rod extended axially through said piston rod, and an actuator mounted on said piston rod for rotating said adjusting rod to adjust the damping force of said shock absorber, the improvement wherein said actuator comprises:

a casing fixedly mounted on the outer end of said piston rod;

a rotor fixedly supported on said adjusting rod and rotatable integrally with said adjusting rod in said casing;

an ultrasonic vibratory element provided in said casing in association with said rotor to generate ultrasonic vibrations upon application thereto of a high frequency voltage; and means, interposed between said ultrasonic vibratory element and said rotor, for transducing said vibrations of said ultrasonic vibratory element into rotary motion of said rotor, and thereby for rotating said adjusting rod.

2. The improvement claimed in claim 1, wherein said transducing means comprises a vibration transmitting member adjacent said ultrasonic vibratory element and having a shape for producing surface waves of high frequency, and a resilient member interposed between said vibration transmitting member and said rotor for receiving said surface waves from said vibration transmitting member and being rotated thereby, and thus for rotating said motor.

3. The improvement claimed in claim 2, wherein said vibration transmitting member is ring-shaped and has spaced protrusions exending from one axial end thereof.

4. The improvement claimed in claim 3, wherein said protrusions comprise trapezoidal teeth.

5. The improvement claimed in claim 4, wherein said vibration transmitting member is securely bonded to one side of said ultrasonic vibratory element.

6. The improvement claimed in claim 2, wherein said resilient member is ring-shaped.

7. The improvement claimed in claim 1, wherein said casing is integrally provided with a mounting eye for attaching said hydraulic shock absorber to a vehicle body.

8. The improvement claimed in claim 7, further comprising a spring provided between an inner wall surface of said casing and said rotor to press said rotor toward said transducing means under a predetermined load.

9. The improvement claimed in claim 8, further comprising a bearing interposed between said spring and said rotor to rotate the latter smoothly against the pressing action of said spring.

* * * * *